Patented June 10, 1930

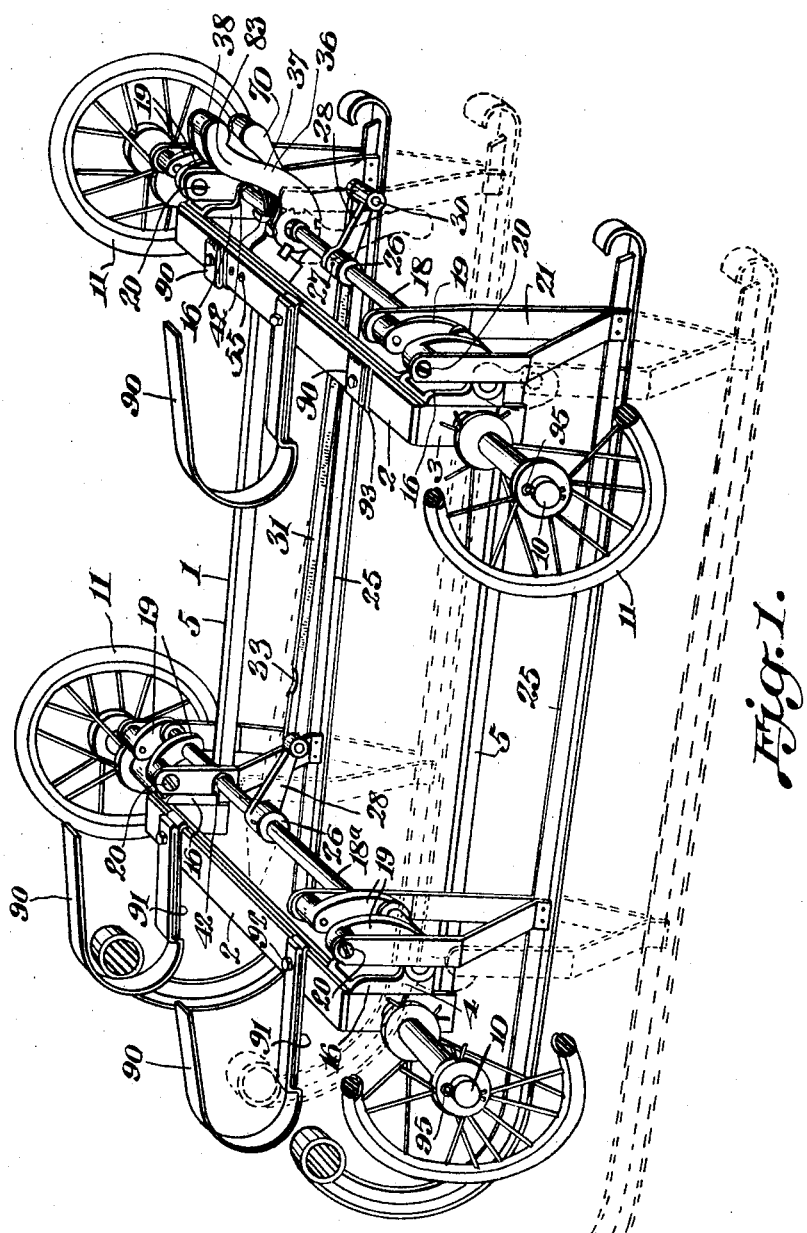

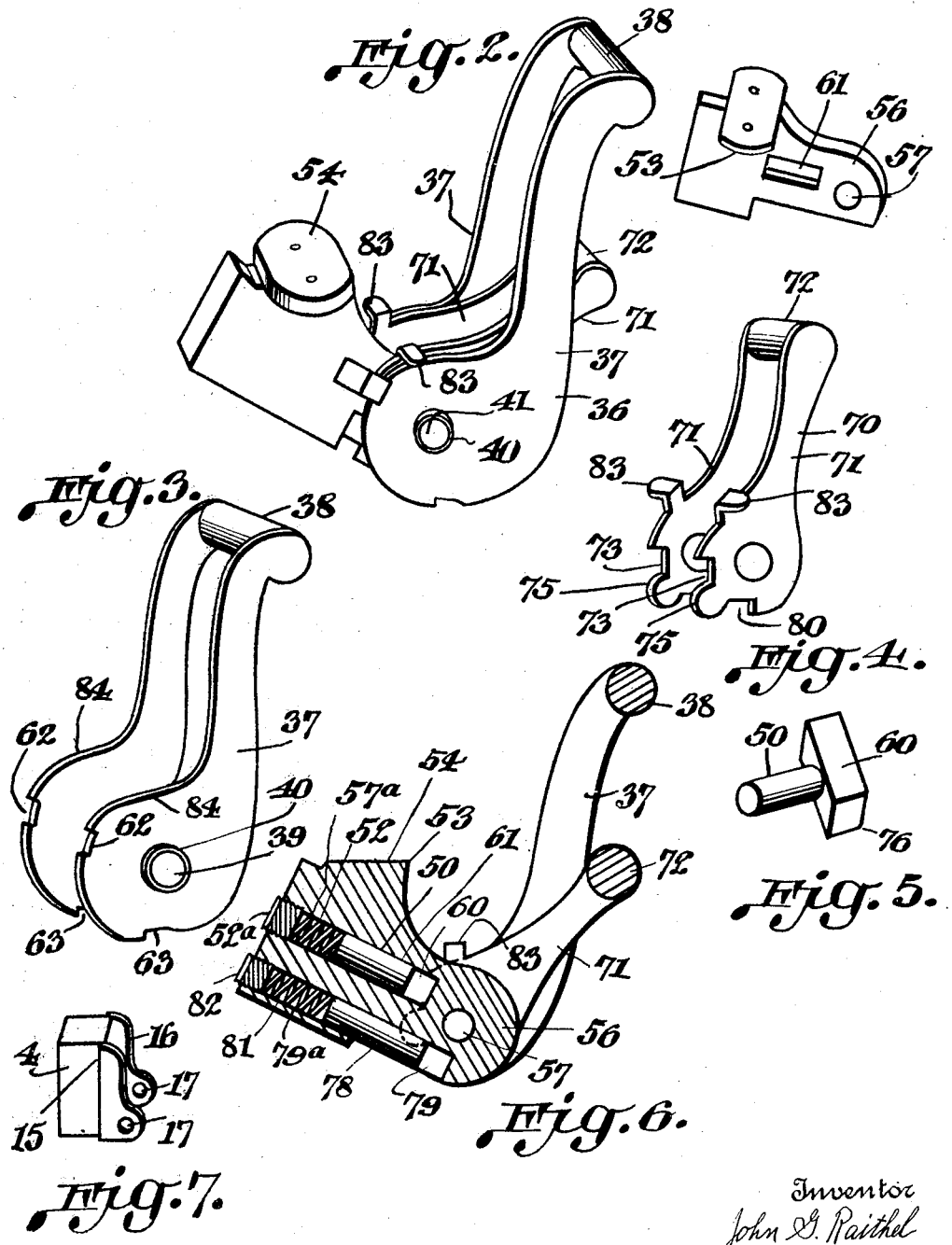

1,762,741

UNITED STATES PATENT OFFICE

JOHN G. RAITHEL, OF LITTLE FALLS, NEW YORK

CONVERTIBLE GEAR FOR VEHICLES

Application filed March 31, 1927. Serial No. 179,821.

My invention relates to a convertible gear for vehicles and I declare the following to be a full, clear, concise and exact description thereof sufficient to enable anyone skilled in the art to which it appertains to make and use the same, reference being had to the accompanying drawings in which like reference characters refer to like parts throughout the specifications.

The object of the invention is to provide a baby carriage with means, whereby runners can be substituted for wheels at the will of the user. To this end, runners are attached to the frame and can be swung into or out of operation by the simple operation of the locking levers or can be removed completely during the summer season.

There is a positive locking device for holding the runners in either operative or inoperative position. Moreover, there is provided means for allowing the runners to swing upward to such an extent as to be quite inoperative and, thereby, give the wheels full opportunity to engage the ground. Furthermore, a plurality of demountable and interchangeable cushion springs are self supporting on the frame. The frame is constructed in such manner as to provide strong studs or journals for the wheels to rotate on.

The object will be understood by referring to the drawings in which:

Fig. 1 is a perspective view of the frame of the vehicle showing the novel features.

Fig. 2 is a detail enlarged view showing a perspective of the means for operating and locking the convertible mechanism.

Fig. 3 is a detail enlarged view showing a perspective of the operating lever.

Fig. 4 is a detail enlarged view showing a perspective of the releasing lever.

Fig. 5 is a detail enlarged view showing a perspective of a plunger employed.

Fig. 6 is a central vertical section of the parts shown in Fig. 2.

Fig. 7 is a detail enlarged view showing a perspective of a filling block and bracket employed.

Referring more particularly to the drawings the device embodies a frame 1 comprising flat laminated cross irons 2 that are bent down at right angles as at 3 at each end and support therebetween filling members 4. Side rods 5, 5 are attached by rivets at either end between ends 3 and just below filling member 4.

Laterally projecting studs forming journals or axles 10 on which wheels 11 rotate are permanently fastened to the frame by being projected through the depending ends 3 and filling member 4 and fastened thereto by brazing or otherwise.

Filling members 4 are shouldered at 15 to form channeled brackets 16 having bearings at 17, 17 for yoke rock shafts 18, 18ª. Knees or curved rock arms 19, 19 are mounted in pairs to turn with rock shafts 18, 18ª, four sets in all. A set is used adjacent each bracket 16. An arm 19 is mounted on each side of bracket 16. The free end of each of said arms 19 is equipped with a threaded aperture for the mounting of a headed bolt 20 that passes through an aperture in one of the upper ends of a wishbone or V-shaped fork 21 in such manner that said bolt is free to turn in the aperture. Each of the two forks 21, 21, that are used in connection with each set of arms 19, 19 is parallel with its mate for a short distance and then tapers inwardly, whereby the lower free ends meet in parallel planes to be riveted to one of the two runners 25. The rear end of each of the runners 25 is turned over into a loop and, likewise, the front end is bent upwards in the arc of a circle and turned into a loop.

In order to cause said arms 19 to rock together, whereby to elevate and lower runners 25 simultaneously, sleeves 26, 26 are fastened to turn with yoke rock shafts 18, 18ª and for this purpose pins 27, 27 are projected through sleeves 26 and shafts 18, 18ª. An arm 28 is made integral with each of the two sleeves 26. The lower or free end of arm 28 has a screw threaded aperture for mounting a screw bolt 30 which also passes through one of the ends of link bar 31. Link bar 31 is free to turn on bolt 30 and has a recess at 33 to clear forward rock shaft 18ª.

The means for rocking shafts 18, 18ª, whereby to actuate arms 19 to elevate and lower runners 25, 25 embodies a twin operating lever 36 having two members 37, 37 that are joined at their upper ends by a cross rod 38. An aperture 39 is made in each of the lower ends of members 37, which aperture is buttressed by a sleeve 40 made integral with member 37. A pin 41 is projected through each of the sleeves 40 and shaft 18 to insure the turning of shaft 18 with lever 36.

By pushing down on the outer or free end of lever 36, shafts 18, 18$^a$ will be rotated and, thereby, actuate the outer ends of arms 19 that are in connection with the upper ends of V-shaped forks 21 to move downward. This downward movement of the free ends of arms 19 will push forks 21 and hence runners 25 downward below the plane on which wheels 11 touch the ground, thereby elevating said wheels 11 off the ground to an inoperative position. By reversing or elevating the end of lever 36, runners 25 will be drawn upward to inoperative position. In order to allow curved rock arms 19 to move to vertical position whereby to elevate runners 25 to maximum position, the innermost member of each of the V-shaped forks 21 is recessed at 42 to allow for clearance of rock shafts 18.

The mechanism for locking operating lever 36 in either of its limiting positions, whereby to hold runners 25, 25 in either operative or inoperative position embodies spring pressed plunger 50. The inner end of said plunger 50 is housed in a sliding manner in a cylindrical recess 52 formed in block 53. The outer end of recess 52 is closed by threaded plug 52$^a$. Block 53 has a horizontally disposed plate 54.

Counter sunk screw threaded apertures are made therein for the reception of screw bolts 55, 55 by which said block 53 is held to the under side of the rear laminated cross iron 2. Block 53 extends rearwardly at 56 which part has an aperture 57 for the loose turning of yoke rock shaft 18$^a$. A coiled spring 57$^a$ is placed in recess 52 in block 53, whereby to push plunger 50 normally outward. Head or cross block 60 is attached or formed integral with plunger 50 and is allowed to move within the limits of rectangular recess 61 that communicates with recess 52.

Head 60 of plunger 50 is adapted to engage open recesses 62, 62 formed in the peripheral edges of members 37, 37, of operating lever 36, whereby to lock said lever in uppermost position or so that runners 25, 25 will be held in elevated or inoperative position and wheels 11 in operative position. Furthermore, head 60 will engage open recesses 63, 63, also formed in the peripheral edges of members 37, 37 of operating lever 36, whereby to lock said lever 36 in lowermost position or so that runners 25, 25 will be held in operative position and wheels 11 in inoperative position.

In order to release head 60 from either recesses 62, 62 or recesses 63, 63 there is employed a twin releasing lever 70 that is mounted on yoke rock shaft 18. The forks 71, 71 of releasing lever 70 are disposed on either side of part 56 of block 53 and in between members 37, 37 of lever 36. A cross piece 72 provides a handle as well as to hold forks 71, 71 together at that location.

Recesses 73, 73 are made in the peripheral edges of the lower ends of forks 71 which recesses allow for clearance of head 60 when engaging either recesses 62, 62 or 63, 63 of operating lever 36. Adjacent recesses 73, 73 there are formed cams 75, 75 adapted to abut against the head 60 and force it out of either set of recesses 62, 62 or 63, 63, when said releasing lever 70 is actuated. The lower edge of head 60 is rounded off at 76 to assist in the approach of cams 75, 75.

In order to hold releasing lever 70 yielding in full line position illustrated in Figs. 1 and 2 or so that its handle end 72 will remain elevated at all times, a spring pressed plunger 78 having a cross piece or head 79 is adapted to engage recesses 80, 80 in twin releasing lever 70. The inner end of plunger 78 rests in a cylindrical recess 79$^a$ formed in block 53 and against coiled spring 81 also disposed therein. Cylindrical recess 79$^a$ is closed at its outer end by screw threaded plug 82. Horizontal shelves 83, 83 are made integral with releasing lever 70. Shelves 83, 83 are adapted to engage the contiguous peripheral edges 84, 84 of operating lever 36 after a limited rocking motion of releasing lever 70 that is sufficient to disengage head 60 from recesses 62, 62, whereby to move said operating lever 36 beyond the location of said recesses 62, 62, so that operating lever 36 can be actuated to its lowermost position. Immediately pressure has been withdrawn from the outer end of releasing lever 70, the same will return to normal position under the influence of spring pressed plunger 78. Likewise cams 75, 75 will push head 60 of plunger 50 out of recesses 63, 63 when it is desired to move operating lever 36 to upper position to elevate runners 25, 25.

Five cushion springs 90 are attached to the upper surface of laminated cross irons 2, whereby to support the body, not shown of the carriage. Three of these springs are located on the rear cross iron 2 and two on the forward. The center of the rear springs 90 is disposed in opposite position to the other two.

The end of each spring 90 is doubled over on itself and with the aid of an extra piece 91 that is disposed adjacent the iron 2 is bolted at 92 to said flat iron. The under end of piece 91 is turned down at right angles, as at 93 to aid in holding spring 90 on said laminated cross iron 2.

Wheels 11 are held to studs or axles by cotter pins 95.

The operation of the device is effected to act as a sleigh by first pressing down or releasing lever 70 to, thereby, disengage cross head 60 of the locking mechanism from recesses 62, 62 of operating lever 36 and at the same time continue to press downward on the outer end of releasing lever 70, whereby to cause shelves 83 thereof to make contact with the contiguous edges of operating lever 36 to rock said operating lever 36 to such position that recesses 62 will be beyond the location of head 60 and, thereafter pressing down on the outer end of operating lever 36 until head 60 snaps into recesses 63. In this latter position, operating lever 36 will be locked, runners 25, 25 will be in operating position, and wheels 11 elevated to inoperative position.

In order to render runners 25 inoperative and wheels 11 operative, the user will again push downward on releasing lever 70 to push head 60 out of recesses 63 formed in operating lever 36. Immediately said head is free from said recesses 63, the weight of the frame will rock yoke shafts 18, 18ª and hence operating lever 36 to such position that that part of operating lever 36 having recesses 63 will move beyond the location of head 60 and thereafter, the handle end of lever 36 can be rocked upward until head 60 snaps into recesses 62, 62.

In the summertime, or when runners 25, 25 are not needed, screw bolts 20 can be taken out and runners 25, 25 removed.

Having thus described my invention what I claim as new and desire to secure by Letters Patent is as follows:

1. In a convertible gear for vehicles, a frame having wheels connected therewith, runners connected to said frame, V-shaped members connected to said runners, arms connected to said V-shaped members, shafts for rocking said arms, a lever for rocking said shafts, a spring pressed member for locking said lever in a given position, a second lever for releasing said first named lever when in locked position and members attached to one of said levers to cause said levers to move together.

2. In a convertible gear for vehicles, a frame having wheels connected therewith, runners attached to said frame, a lever for actuating said runners in a vertical plane, a spring pressed plunger for locking said lever in predetermined position, a second lever disposed within said first lever for releasing said first named lever when in locked position, and shelves attached to said second named lever for engaging said first named lever, whereby to move it from locked position.

3. In a convertible gear for vehicles, a frame having wheels connected therewith, runners, arms for connecting said runners to said frame, a lever for actuating said arms to move said runners, a spring pressed plunger for locking said lever in given position, a second lever disposed within said first lever for releasing said first named lever when in locked position and shelves on said second named lever for engaging said first named lever, whereby to move it from locked position.

In testimony whereof I have affixed my signature.

JOHN G. RAITHEL.